Nov. 23, 1965 ZENJI KATAGATA ETAL 3,219,755
TRANSMITTED FACSIMILE DATA TRANSMISSION SYSTEM USING GLOW TUBE AND ELECTROFAX PAPER
Filed Feb. 20, 1962
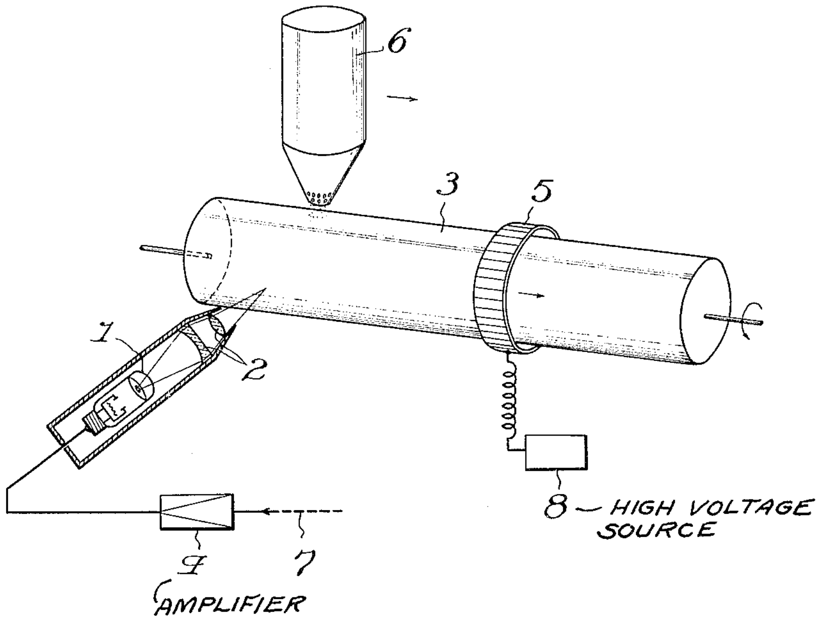

3,219,755

TRANSMITTED FACSIMILE DATA TRANSMISSION SYSTEM USING GLOW TUBE AND ELECTROFAX PAPERS

Zenji Katagata, Kawasaki-shi, and Noboru Masuda, Tokyo-to, Japan, assignors to Denki Onkyo Kabushiki Kaisha, Tokyo-to, Japan, a joint-stock company of Japan Filed Feb. 20, 1962, Ser. No. 174,536
Claims priority, application Japan, Nov. 30, 1961, 36/42,602
2 Claims. (Cl. 178—6.6)

This invention relates generally to data transmission and more particularly to a data transmission system by a new shutterless facsimile receiving apparatus wherein a glow tube and Electrofax paper are used.

The conventional reception and recording method of data transmission by facsimile which is commonly known is due to the discharge rupturing system, the semi-wet type electrochemical recording system (so-called Hogan method), or the Electrofax system. While these systems have some advantages, they have many disadvantages and are not definitely satisfactory. The reception and recording systems in phototelegraphy are of the wet type and, accordingly, have the disadvantage of requiring such facilities as a darkroom.

It is an object of the present invention to eliminate such disadvantages as stated above by providing a new method of transmitting and recording information, wherein electronic recording paper and a glow tube are used, and whereby facsimile communication is accomplished in a clear, appropriate, and easy manner.

The nature and details of the invention as well as the manner in which the foregoing object of the invention may best be achieved will be more clearly apparent by reference to the following description taken in conjunction with the accompanying drawing, which is a schematic diagram, partly in perspective, showing one representative embodiment of apparatus suitable for use in accordance with this invention.

The apparatus shown in the drawing comprises elongated capsule in which is disposed a glow tube 1, and a focusing lens 2, of an optical system as shown. A reception recording drum 3, a reception amplifier 4, a high voltage annular electrode 5, and a storage vessel, so-called toner 6, for developing carbon powder are provided. The glow tube 1 is connected to a receiving end of a transmission line 7, and the electrode 5 is connected to a high voltage power supply source 8.

It will now be assumed that a current or facsimile picture signal is received from the transmission by the reception amplifier 4 which carries out such functions as regeneration, current limiting, and amplification and generates the power required for the glow tube 1, and that a flux of light or modulated radiant energy which responds corresponds to the current variations of white, black, half tones, etc., of the input signal is created by this glow tube 1. When this flux of light or modulated radiant energy is focused on a point on the reception recording drum 3, through a tip opening disposed opposed to the recording paper, a light spot of the required size having a maximum quantity of light of flux is created.

The reception recording drum 3 is made to rotate at a synchronous speed which is the same as that of the drum at the sending side of the transmission line and is wrapped with an "Electrofax" paper or recording medium. A high voltage is imparted by the high voltage electrode 5 and maintains electrostatic voltage on the surface of the said paper.

If, on this "Electrofax" paper, the required light spot is projected from the optical system consisting of the glow tube 1 and focusing lens 2, electrical discharging which is in accordance with the light-and-dark state of the light spot will be caused, and an electrostatic latent image corresponding to such an image as letters, characters and pictures etc. existing on the drum at the sending side of the transmission line will be created. The storage vessel 6 for carbon powder, which follows this optical system, is adapted to sprinkle carbon powder on the drum 3, whereby the carbon powder is caused to adhere to the electrostatic latent image, and a recorded image of excellent fineness of definition of white, black, and half tones corresponding to the image at the sending side is obtained on the drum 3.

The transmission and recording system of the present invention as described above has a wide range of uses, such as applications to facsimile telegraph equipment, office duplicators, and data transmission equipment. By the practice of this invention in all such applications, clear and appropriate images can be reproduced and recorded in an easy manner.

Since it is obvious that many changes and modifications can be made in the above described details without departing from the nature and spirit of the invention, it is to be understood that the invention is not to be limited to the details described herein except as set forth in the appended claims.

What is claimed is:

1. A shutterless facsimile receiver apparatus comprising, a rotatably driven drum, a paper capable of receiving an electrostatic charge disposed circumferentially of said drum, an annular high voltage electrode disposed circumferentially of said drum spaced therefrom for applying an electrostatic charge to said paper, a high voltage source connected to said electrode for applying a high voltage thereto, an elongated capsule having a tip opening disposed opposed to said paper, a glow tube in said capsule, an amplifier connected to said glow tube for receiving an electrical signal applied to said glow tube to modulate radiant energy therefrom for application to said paper thereby to define on said paper a latent electrostatic image in dependence upon the radiant energy modulated by the received signal, a lens system in said capsule for focusing the radiant energy from said glow tube on said paper, and means comprising a vessel for sprinkling a fine carbon powder on said paper to develop said latent image on said paper.

2. A shutterless facsimile receiver according to claim 1, in which said paper comprises an Electrofax paper.

References Cited by the Examiner

UNITED STATES PATENTS

| | | | |
|---|---|---|---|
| 2,250,730 | 7/1941 | Stewart et al. | 178—6.7 |
| 2,583,546 | 1/1952 | Carlson | 178—6.7 |
| 2,716,048 | 8/1955 | Young | 178—6.6 |
| 2,958,737 | 11/1960 | Hollman | 178—6.7 |

DAVID G. REDINBAUGH, *Primary Examiner.*

ROY LAKE, *Examiner.*